United States Patent [19]

Pianezza

[11] 4,095,090
[45] June 13, 1978

[54] ELECTRICALLY-HEATED CONTAINER

[76] Inventor: Anthony Pianezza, 3445 Donna St., Springfield, Ill. 62707

[21] Appl. No.: 754,907

[22] Filed: Dec. 27, 1976

[51] Int. Cl.² ............................................. F27D 11/02
[52] U.S. Cl. ................................. 219/441; 219/435; 219/438; 320/2
[58] Field of Search ............... 219/262, 263, 264, 268, 219/386, 387, 432, 433, 434, 435, 436, 438, 439, 441, 442; 320/2

[56] References Cited

U.S. PATENT DOCUMENTS

| | | | |
|---|---|---|---|
| 1,319,559 | 10/1919 | Bjorkholm et al. | 219/436 |
| 1,699,610 | 1/1929 | Riccio | 219/441 |
| 2,016,358 | 10/1935 | Blackmann et al. | 219/435 |
| 2,177,337 | 10/1939 | Stein | 219/438 UX |
| 2,500,390 | 3/1950 | Wales | 219/441 |
| 2,526,447 | 10/1950 | Aiken | 219/436 X |
| 2,700,097 | 1/1955 | Morey | 219/435 X |
| 3,432,641 | 3/1969 | Welks | 219/433 |
| 3,806,701 | 4/1974 | Scott | 219/438 |
| 3,931,494 | 1/1976 | Fisher et al. | 219/441 |
| 3,972,179 | 8/1976 | Weber | 320/2 |

FOREIGN PATENT DOCUMENTS

| | | | |
|---|---|---|---|
| 420,190 | 10/1925 | Germany | 219/441 |
| 520,218 | 3/1955 | Italy | 219/263 |
| 676,483 | 7/1952 | United Kingdom | 219/441 |
| 725,341 | 3/1955 | United Kingdom | 219/441 |

Primary Examiner—Volodymyr Y. Mayewsky
Attorney, Agent, or Firm—Grace J. Fishel

[57] ABSTRACT

An improved container for heating beverages, soups, stews and like foods containing liquid matter which includes at least one electric heating unit embedded within the side and/or bottom walls of the container, said heating unit being connectable to a source of electric energy, and means responsive to the position of the container with respect to the supporting surface interposed between said heating unit and the electric energy source for switching on or off electric current to the heating unit.

9 Claims, 8 Drawing Figures

U.S. Patent   June 13, 1978   4,095,090
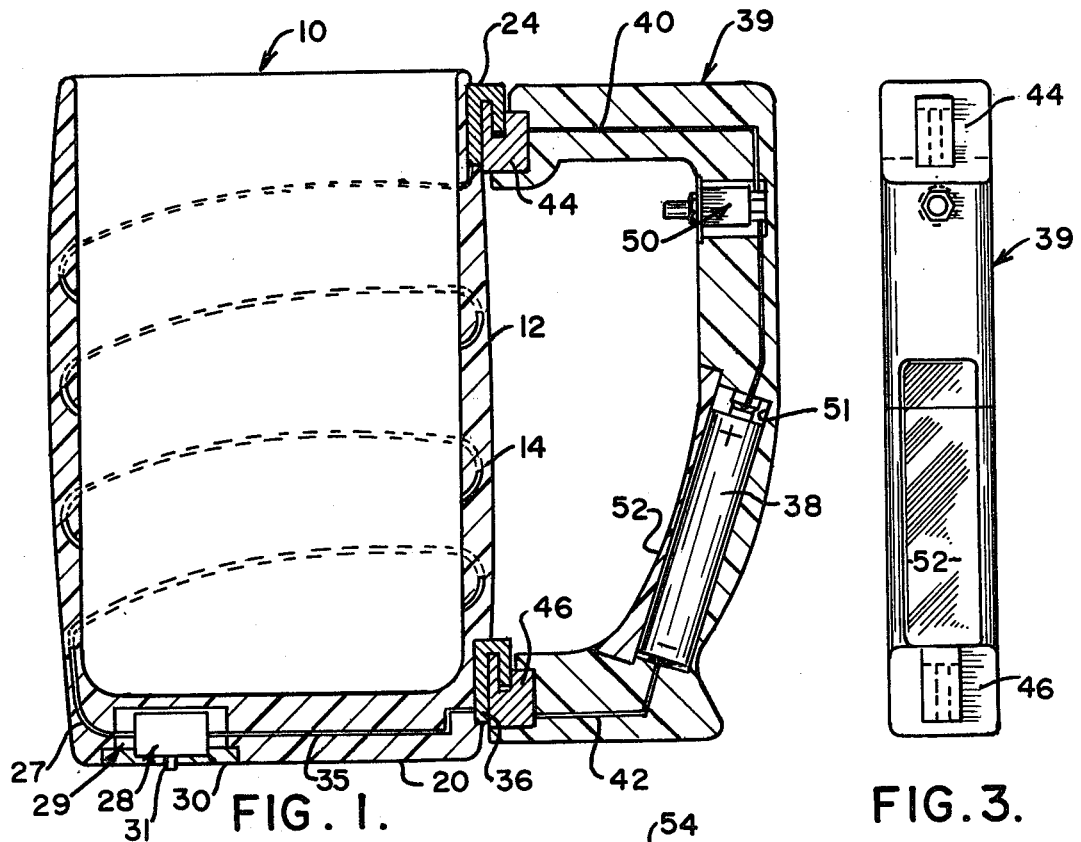
FIG. 1.
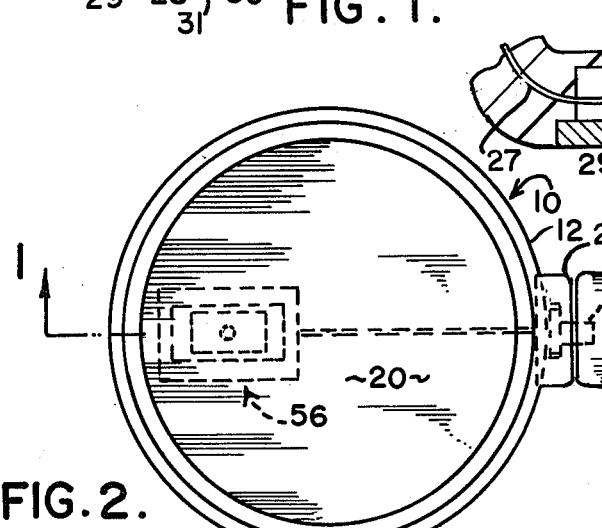
FIG. 2.
FIG. 4.
FIG. 5.
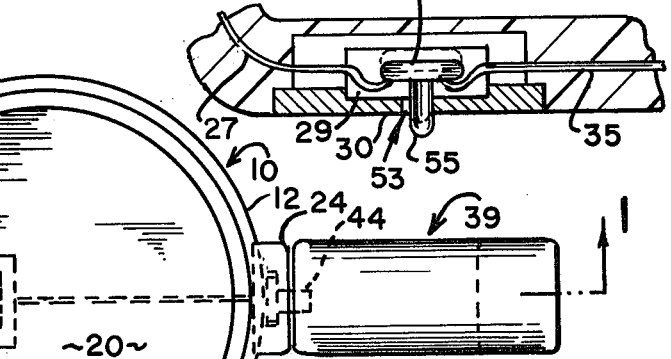
FIG. 7
FIG. 6.
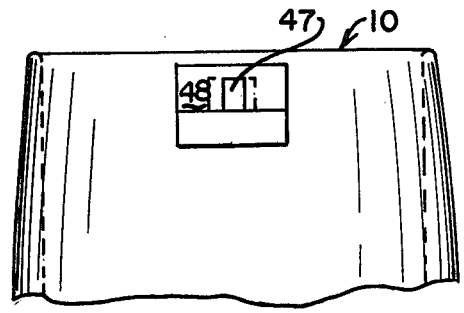
FIG. 3.
FIG. 8.

ELECTRICALLY-HEATED CONTAINER

This invention relates to electrically-heated beverage or liquid food containers wherein the supply of electric energy to an electrical heating unit embedded in the side or bottom walls of a container is dependent upon the position of the container with respect to a supporting surface.

Heretofore, electrically-heated containers such as cups, pots, coffee brewers and the like have been provided with thermostats or manually operated switches. Such containers fail to provide simple means to turn the heating unit on and off in response to changes in the position of the container with respect to a supporting surface.

Moreover, such containers do not have means to automatically turn off the electric energy when most or all the food contents have been removed. This is not only wasteful of electrical energy, which is particularly important when the energy source is a battery, but also causes a crust to form on the sidewalls above the liquid level making cleaning more difficult.

In view of the above, there is a need for an electrically-heated container having means for regulating the supply of electric energy to the container's heating unit in response to changes in the container's orientation with respect to the horizontal surface on which the container is normally rested. Such a device is particularly useful out-of-doors or in the field since it does not require the user to mainpulate a switch. This feature is particularly advantageous when the user's hands are stiff with cold.

There is also a need for an electrically-heated container having weight-responsive means for regulating the supply of electric energy to the container's heating unit in accordance with the weight of the container.

All embodiments of the present invention satisfy the first need while some satisfy both. Other objects and features will be in part apparent and in part pointed out hereinafter. The invention accordingly comprises the constructions hereinafter descried, the scope of the invention being indicated in the subjoined claims.

As shown in the drawings, when the switch is weight responsive, suitable weight-responsive means comprise a gravity actuated switch whose contacts are normally open when the container is hand held, but whose contacts are closed when the container rests on a table or other level surface. In other embodiments, a compression spring bear against the bottom wall or base of the container and against the supporting surface, said spring being compressible by the weight of the container when it is filled. Thus, said spring tilts the container from its horizontal relationship with the support surface when a selected amount of the container's contents have been removed. In this instance, a mercury switch whose electrical contacts are normally closed when the container's base is level with the horizontal support surface can be used as the weight-responsive means. When the container is tilted by the compression spring, the switch is opened thus disconnecting the container's heating unit from the electric energy source.

Suitable weight-responsive means integral with the switch include momentary contact, normally open, single pole switches. Such switches have a push button which when pushed against an internal spring pressure close the switch, and which open when the pressure is removed.

In the accompanying drawings, in which several of various possible embodiments of the invention are illustrated, FIG. 1 is a vertical cross-section of a drinking cup taken along line 1—1 in FIG. 2 illustrating one embodiment of the present invention;

FIG. 2 is a top plan view as the cup shown in FIG. 1;

FIG. 3 is a side elevational view of the handle detached from the cup;

FIG. 4 is a top plan view of a normally closed mercury switch having two contacts;

FIG. 5 is a vertical cross-sectional view taken on line 5—5 of FIG. 4;

FIG. 6 is a vertical cross-sectional view like FIG. 5 except of a normally open mercury switch;

FIG. 7 is a vertical cross-sectional view like FIGS. 5 and 6 abut showing still another switch; and FIG. 8 is a side elevational view of a portion of the cup showing a metal tang for attachment of the handle shown in FIG. 3.

In the interests of clarity, certain portions of the drawings are not to scale. Furthermore, throughout the several views of the drawings, corresponding reference characters refer to corresponding parts.

Referring to FIGS. 1-3, a drinking cup 10 for heating beverages, such as coffee, tea, cocoa or the like, is formed of a heat-resistant, electrical insulating plastic. Cermaic materials are also suitable. Embedded in vertical sidewall 12 of cup 10 is an electric heating coil 14. Embedded heating coil 14 extends helically upwardly from a base or bottom wall 20 and electrically terminates in an inverted "J" shaped metal tang 24 partially embedded in the cup's vertical sidewall 12 near its upper extremity. The other end of heating coil 14 is electrically connected by a lead 27 to a single pole, momentary contact, normally open switch 28 positioned in a cavity 29 in bottom wall 20. Switch 28 is retained in cavity 29 by a force-fitted compressible plug 30. Switch 28 in its normally open position as shown has a downwardly extending button 31 projecting from base 20. Switch 28 includes a compression spring (not shown) which pushes button 31 downwardly. The compression spring is preferably so selected that the weight of empty cup 10 is insufficient to depress button 31 and close switch 28. On the other hand, it is preferably so selected that button 31 is depressed when the cup is filled with a selected weight of contents.

As above-mentioned, one contact of switch 28 is connected by lead 27 to the lower end of heating coil 14. The other contact of switch 28 is electrically connected by a lead 35 to a second, inverted "J" shaped metal tang 36. Electric energy is supplied to tangs 24 and 36 by a battery 38 enclosed within the lower portion of a detachable handle assembly 39.

Battery 38 is electrically connected by leads 40 and 42 to metal sockets 44 and 46, respectively. Sockets 44 and 46 are cooperatively shaped for frictional engagement with metal tangs 24 and 36, respectively. More particularly, as shown, metal tangs 24 and 36 include a keyway 47 in a downwardly depending flange 48. Sockets 44 and 46, as best seen in FIG. 2, are "T" shaped, the stem of the "T" fitting in keyway 47 and preventing lateral displacement of handle 39 from cup 10.

Optionally, as shown, an on-off switch 50 is interposed in lead 40 to cut off the electrical supply when the cup contains sufficient liquid to normally activate the weight-responsive switch 28, but the user does not presently want the contents heated.

Battery 38 is preferably rechargeable and is retained in a cavity 51 in handle 39 by a snap-in cover 52. To avoid corrosion of the battery's terminals and of switch 50, handle assembly 39 is preferably detached from tangs 24 and 36 before the cup is washed. Thus, cup 10 can be safely immersed without harm to the electrical circuits. Switch 28 is protected from the water by plug 30.

With reference to FIG. 7, there is shown another gravity operated switch 53 which functions in a manner opposite to switch 28. Switch 53 includes a metal disc 54 attached to one end of rod 55 preferably formed of an insulating material. When the lower face of disc 54 resets on the terminal ends of leads 27 and 35, the switch is closed and current flows from battery 38 through heating coil 14.

When cup 10 is placed on a supporting surface, the weight of the cup overcomes the gravity force holding disc 54 in contact with leads 27 and 35 and forces rod 55 with disc 54 into the position shown in broken lines, opening the switch.

The embodiment shown in FIG. 7 is particularly advantageous for use at outdoor events where the user holds the cup in his hands until the contents are drunk. Thereafter, when the cup is put down, rod 55 automatically causes switch 53 to open, thereby preventing further current flow from battery 38.

FIGS. 4 and 5 show still another switch 56 useful in the present invention. Leads 57 and 58 of switch 56 are connected to leads 27 and 35 in place of switch 28. As shown in FIG. 5, a drop of mercury 59 is hermetically sealed in a cavity 60 in contact with leads 57 and 58 when switch 56 is in level condition. When cup 10 is tilted, drop of mercury 59 rolls in cavity 60 out of contact with leads 57 and 58 and the switch is opened.

FIG. 6 shows still another switch 61. Switch 61, like switch 53, is the reverse of switch 56. As shown, leads 62 and 63 are connected to leads 27 and 35. Drop of mercury 64 contacts leads 62 and 63 when the cup is tilted. Hence, the cup is heated only when it is held in the hand or otherwise sufficiently tilted to close switch 61.

When cup 10 is vigorously washed in automatic dishwashing equipment or the like, there is no possibility that hermetically sealed switches 56 and 61 will be wetted. For some applications, therefore, these switches may be preferred.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed is:

1. A device for heating liquid material comprising a container formed of dielectric material with a base, a sidewall and a detachable handle, an electrical heating unit embedded in said container, said heating unit having two heating leads, the first heating lead connected to a first electricity conducting tang mounted on the sidewall and the second heating lead connected to a switch mounted on the base, said switch having a switch lead connected to a second electricity conducting tang mounted on the sidewall, said handle including a battery with first and second battery leads connected to cooperating electricity conducting sockets, said tangs cooperating with said sockets and providing means for structural and electrical connection of the detachable handle to the sidewall, said switch responsive to changes in the position of the container when the container is picked up by the user.

2. The device for heating liquid material according to claim 1 wherein an on-off switch is interposed in one of said battery leads.

3. The device for heating liquid material according to claim 2 wherein the switch responsive to changes in position in a single pole, normally open switch.

4. The device for heating liquid material according to claim 2 wherein the switch responsive to changes in position is a single pole, normally closed switch.

5. The device for heating liquid material according to claim 2 wherein the switch responsive to changes in position is a normally open mercury switch.

6. The device for heating liquid material according to claim 2 wherein the switch responsive to changes in position is a normally closed mercury switch.

7. The device for heating liquid material according to claim 5 wherein the normally open mercury switch includes a mercury drop hermetically sealed in a cavity in the base, said drop being out of electrical contact with first and second contacts when the container is level and in electrical contact when the container is tilted a preselected degree.

8. The device for heating liquid material according to claim 7 wherein the first contact is connected to the second heating lead and the second contact is connected to the switch lead.

9. The device for heating liquid material according to claim 6 wherein the normally closed mercury switch includes a mercury drop hermetically sealed in a cavity in the base, said drop being in electrical contact with first and second contacts when the container is level and out of electrical contact when the container is tilted a preselected degree.

* * * * *

UNITED STATES PATENT AND TRADEMARK OFFICE
CERTIFICATE OF CORRECTION

PATENT NO. : 4,095,090
DATED : June 13, 1978
INVENTOR(S) : Anthony Pianezza

It is certified that error appears in the above-identified patent and that said Letters Patent are hereby corrected as shown below:

Column 1, line 50, "bear" should read --bears--.

Column 2, line 17, "abut" should read --but--.

Column 3, line 14, "resets" should read --rests--.

Column 4, line 26, claim 3, "in" should read --is--.

*Signed and Sealed this*

*Twelfth* Day of *December 1978*

[SEAL]

*Attest:*

RUTH C. MASON
*Attesting Officer*

DONALD W. BANNER
*Commissioner of Patents and Trademarks*